Figure 1:
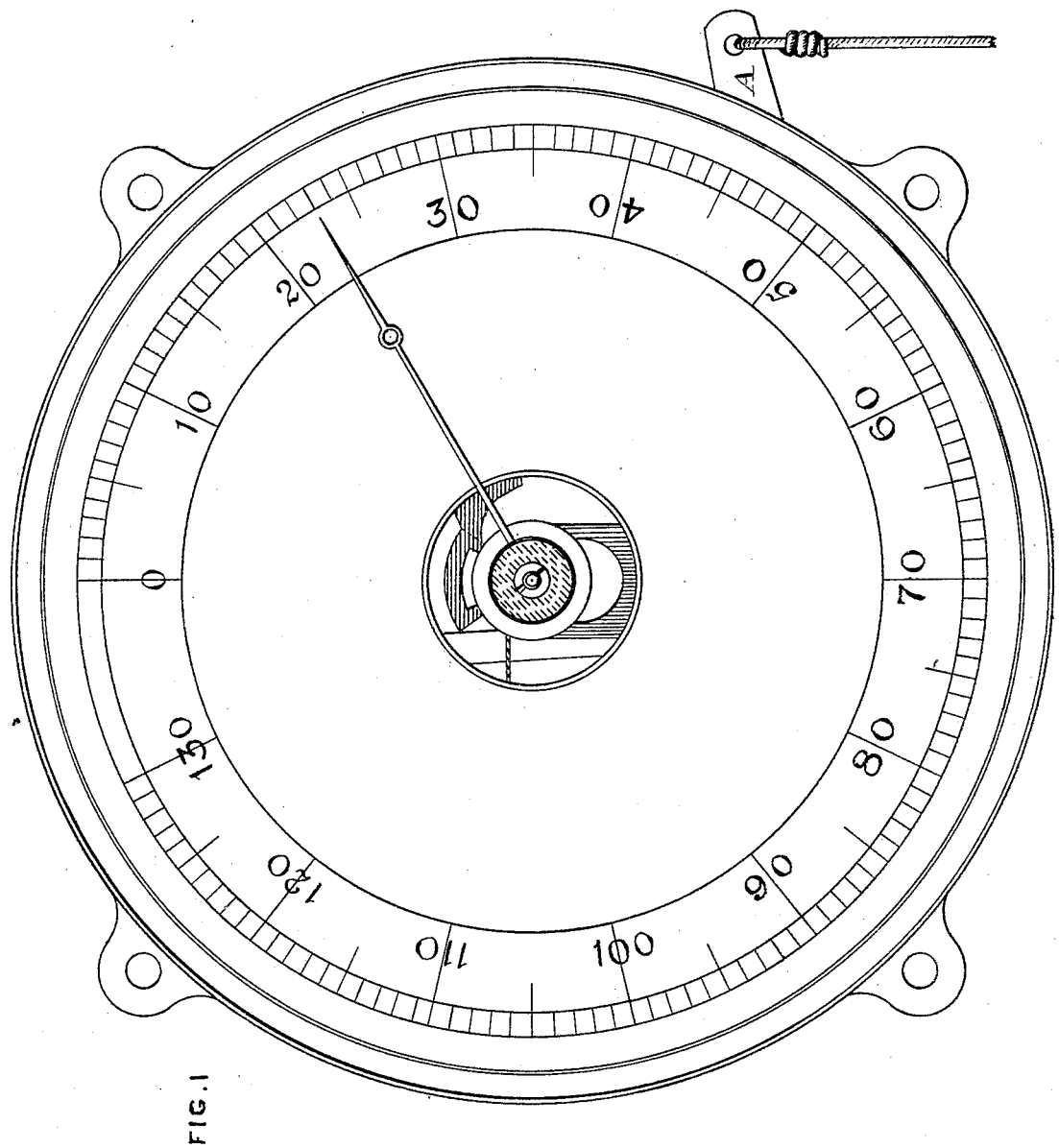

6 Sheets—Sheet 1.

A. BARLOW.
REVOLUTION INDICATOR.

No. 175,549. Patented April 4, 1876.

Witnesses:

Inventor:
A. Barlow
by his attorney

6 Sheets—Sheet 2.

A. BARLOW.
REVOLUTION INDICATOR.

No. 175,549. Patented April 4, 1876.

Witnesses:

Inventor:
A. Barlow
by his attorney

A. BARLOW.
REVOLUTION INDICATOR.

No. 175,549. Patented April 4, 1876.

6 Sheets—Sheet 3.

Witnesses:

Inventor:
A. Barlow
by his attorney

6 Sheets—Sheet 4.
A. BARLOW.
REVOLUTION INDICATOR.
No. 175,549.  Patented April 4, 1876.
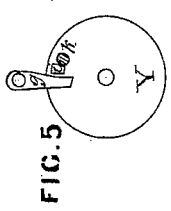
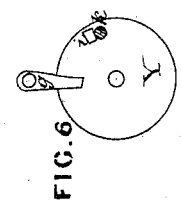
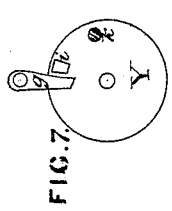
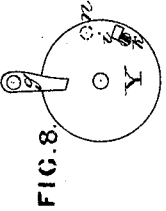
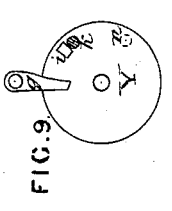
FIG. 5. FIG. 6. FIG. 7. FIG. 8. FIG. 9.
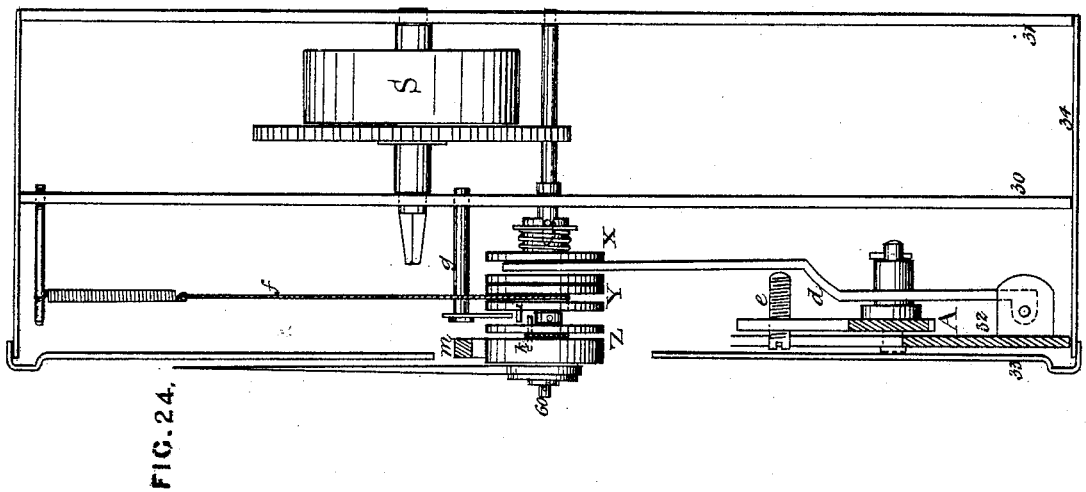
Witnesses:
Inventor:
A. Barlow
By his attorney

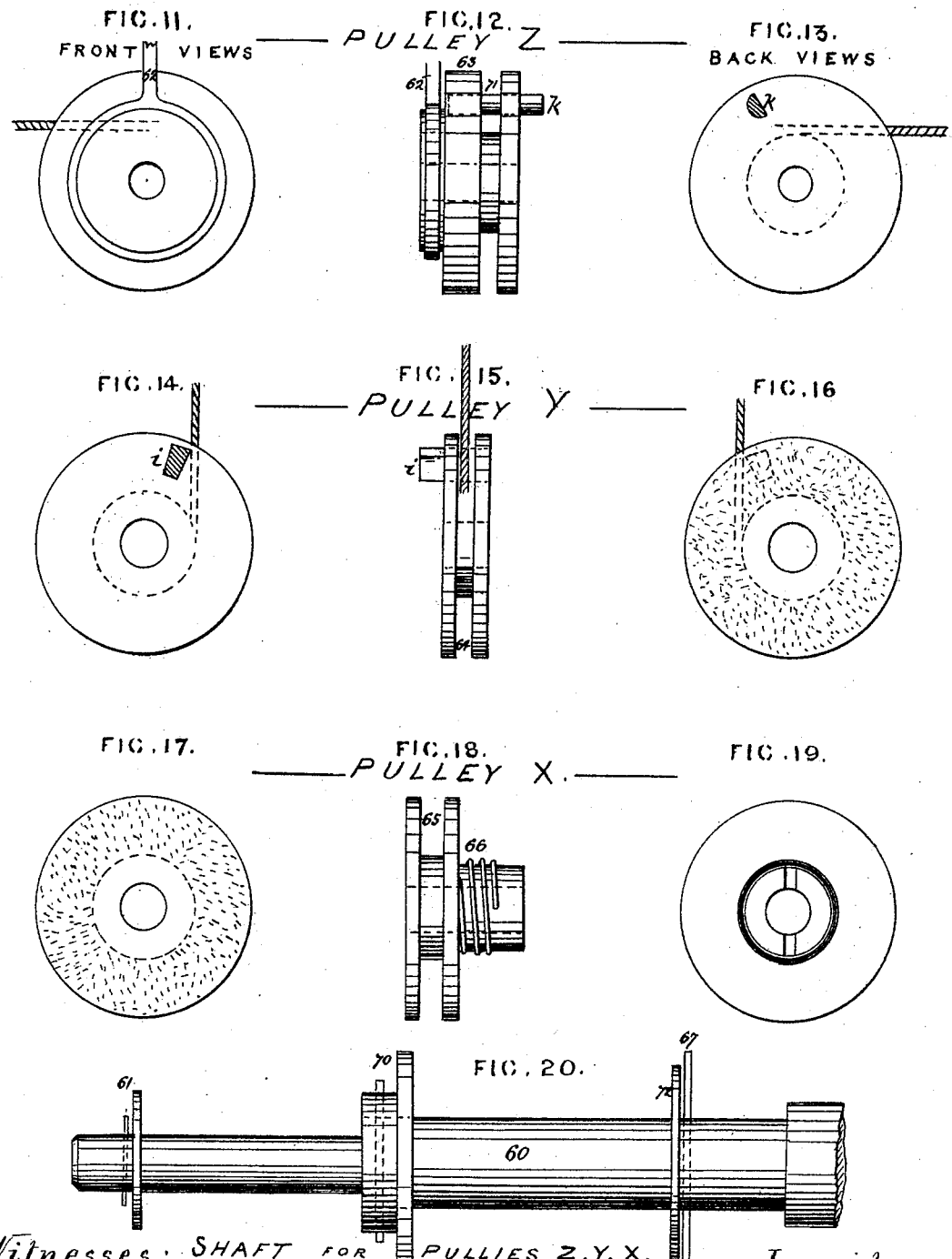

6 Sheets—Sheet 6.

A. BARLOW.
REVOLUTION INDICATOR.

No. 175,549.      Patented April 4, 1876.

Witnesses:

Inventor:
A. Barlow
by his attorney

UNITED STATES PATENT OFFICE.

ALFRED BARLOW, OF PAKENHAM STREET, GRAY'S INN ROAD, GREAT BRITAIN.

IMPROVEMENT IN REVOLUTION-INDICATORS.

Specification forming part of Letters Patent No. 175,549, dated April 4, 1876; application filed January 24, 1876.

*To all whom it may concern:*

Be it known that I, ALFRED BARLOW, of Pakenham street, Gray's Inn Road, in the county of Middlesex, Kingdom of Great Britain and Ireland, engineer, have invented new and useful improved machinery for indicating the number of rotations or other movements per minute or other portion of time of shafts or other bodies, which invention is fully set forth in the following specification, reference being had to the accompanying drawings.

This invention has for its object improved machinery for indicating the number of rotations or other movements per minute or other portion of time of shafts or other bodies; and relates to apparatus in which a finger is moved through the medium of a friction coupling or clutch by means of apparatus receiving motion primarily from the shaft or body to be indicated, and having its action governed by clock mechanism. In one arrangement the finger or pointer is actuated through the medium of the friction coupling or clutch directly from a primary lever or rocking shaft, the finger being released at proper intervals by the clock mechanism operating a brake. In another arrangement the finger is moved through the medium of the friction coupling or clutch directly from the clock mechanism, the finger being released at proper intervals by the primary lever or rocking shaft, causing the disengagement of the friction coupling or clutch.

The object of this invention is, as before stated, to show, by means of a dial and pointer or finger, the number of revolutions or intermittent motions that has been performed during the preceding minute or other unit of time. The dial is divided into any convenient number of spaces that may be desired, but the example that will be shown is divided into one hundred and thirty spaces, which number is suitable to the usual number of revolutions made by steam-engines per minute.

The finger is fixed to a pulley, which is provided with a presser or friction brake.

In one arrangement, at each revolution or motion to be shown the finger is moved one space on the dial—*i. e.*, if it commences at zero. At the termination of the minute the finger stops and shows the number of revolutions made, until at the end of the next minute, when the finger has either advanced or retreated to show the number of revolutions made during the last minute, and so the operation is repeated.

This operation is carried out by means of three pulleys placed upon one shaft, and constituting the main portions of what is hereinafter called the friction apparatus. The first pulley revolves with the shaft, but it is capable of being moved a short distance longitudinally upon the shaft. The second pulley is placed loose upon the shaft, and adjoins the first pulley. The first pulley is provided with a spring, which is so fixed as to press that pulley against the second pulley, and thereby form a friction clutch or coupling. There is a fork which fits into a groove of the first pulley, by means of which the spring can be pressed backward, and thereby release the gripe or friction of the two pulleys—*i. e.*, the first and second.

Now, the second pulley is provided with a stud, which, when that pulley is in its normal position, is in contact with a stop, and each time that the pulley is released from the pressure of the first pulley it is returned to the stop or normal position by means of a spring and cord working in a groove made in the pulley. Thus the second pulley may be advanced by the first pulley nearly a whole revolution, but immediately the fork releases the pressure of the spring the second pulley returns quickly to the stop or zero. Therefore, if the fork be brought into action at the termination of each minute of time, the second pulley returns to zero and recommences its motion immediately the pressure is resumed by the first pulley.

The finger or pointer is fixed upon the third pulley, and it is provided with a stud so placed on the side of the pulley as to come into contact with the stud on the second pulley. Consequently when the second pulley is advanced by means of the first it pushes forward the third also. But when the second is released, as before described, the third does not return with it, for it is held in the position it has been brought to by means of a brake of sufficient power to hold it in position only, but not too strong to prevent the second pulley in its motion when the studs are in contact overcoming the brake and carrying forward the finger or third pulley. Therefore whenever the brake on the third pulley is released the finger and pulley are drawn by a spring and cord to their normal position, which is against the stud of the second pulley.

The machine consists of two main portions. One portion consists of the friction arrangement above named, which in the one arrangement is operated by the shaft or engine that is to be indicated, and the other main portion of the machine is a clock or time motion which throws out of gear the friction or first pulley at the termination of each minute or other unit of time.

My invention is illustrated by the accompanying six sheets of drawings.

Figure 2:
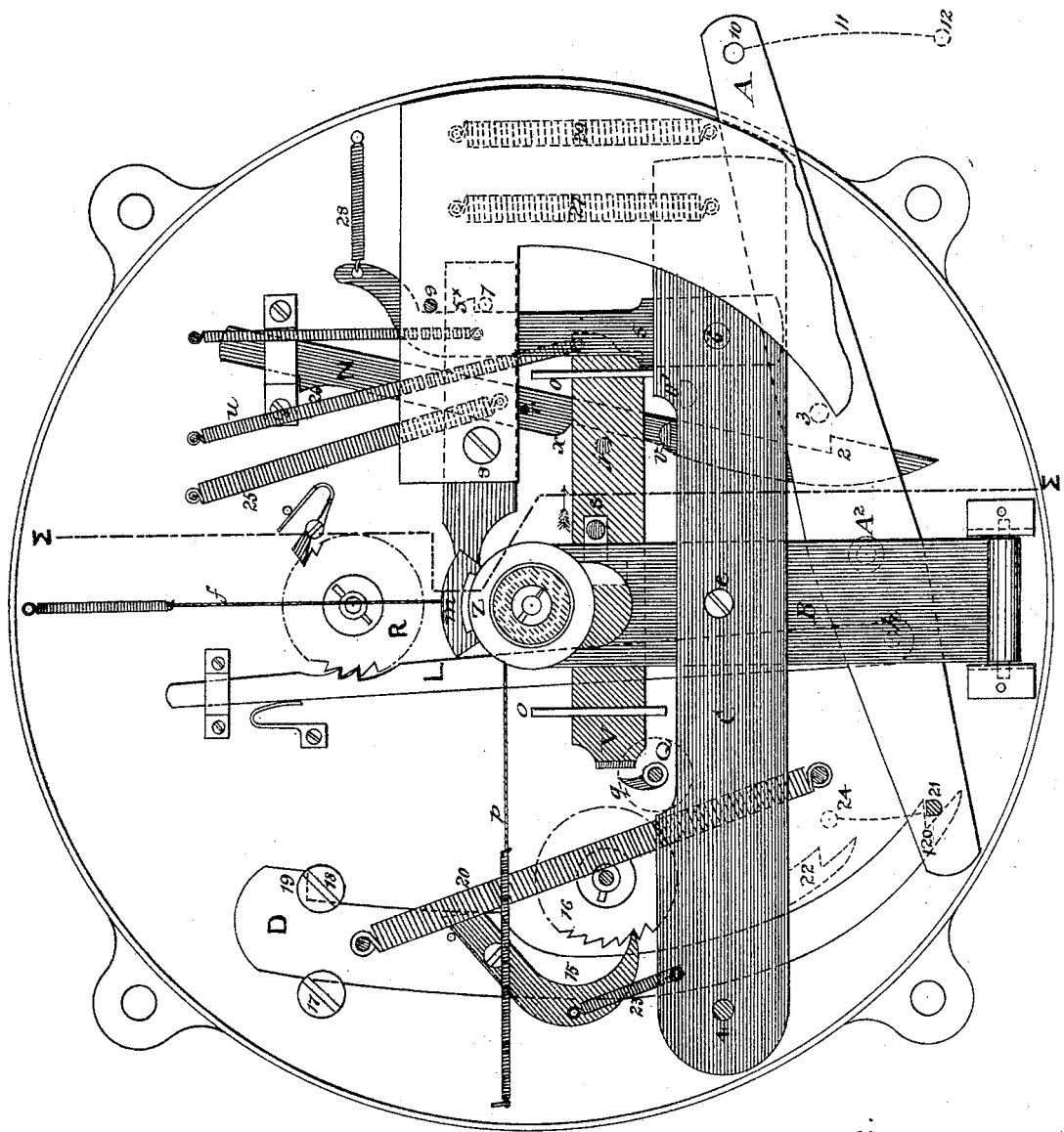
Figure 3:
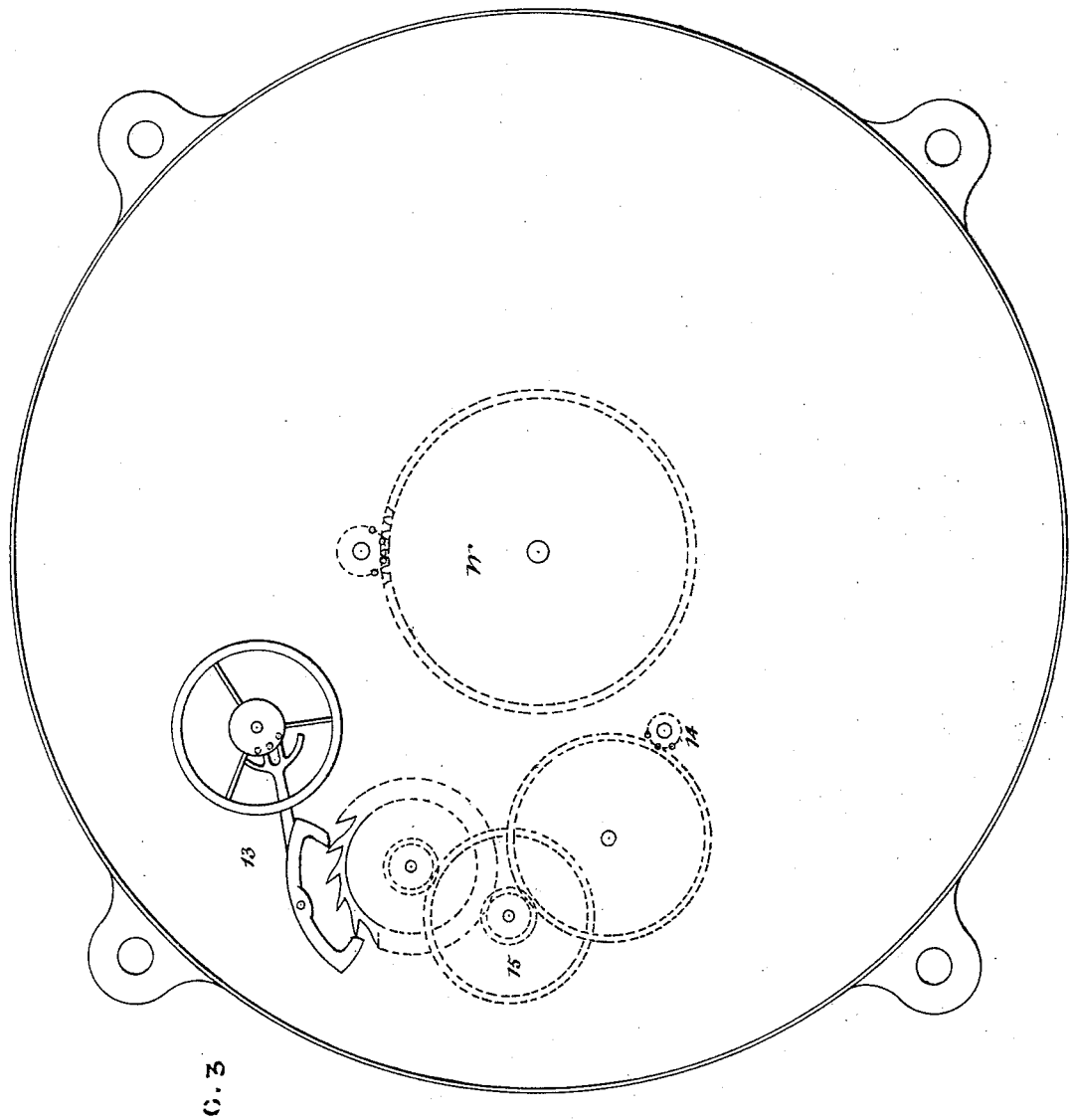

Figure 1 is a front view of the arrangement last above referred to. Fig. 2 is a front view with the dial removed, various portions being broken in the drawing to show the mechanism more distinctly. Fig. 3 is a diagram illustrating the clock-work arrangement, and Fig. 4 is a vertical section of the apparatus, representing the principal portions in the line $M^* M^*$ of Fig. 2. Figs. 5 to 9 are diagrams, showing the action of the stops on the second and third pulleys.

In all the above figures the same letters and marks refer to the same parts.

Motion is given to the machine by means of a cord or wire attached to the lever A, whose fulcrum is at $A^2$, by means of which cord the lever is drawn downward at each revolution or motion to be indicated. This lever A has three offices to fulfil, namely: First, to wind up the clock-work; second, to actuate the indicator through suitable mechanism; and, third, through other mechanism to release at the proper times the brake and the friction apparatus through which motion is communicated to the finger or pointer.

The three pulleys, which form part of the friction apparatus which moves the finger or pointer, are shown at X Y Z, Fig. 4, and separately in section in Fig. 10; also to an enlarged scale with their shaft in Figs. 11 to 20, inclusive.

There is a barrel on pulley X, upon which is placed a spiral spring, as shown. A slot is made in the barrel, through which and the shaft is passed the pin $a$, and it is through this pin that the pulley is moved by the shaft. Pulley Y fits loosely on the shaft next to pulley X, and the two pulleys are pressed together by the action of the spiral spring, for the spring presses against the pin $a$ and against the side of the pulley X, which, in its turn, presses the pulley Y against a collar which is pinned fast upon the shaft. The fork B fits into the groove formed in pulley X, and this fork, when pressed by the downward movement of the lever C, through the medium of the adjusting-screw $e$, sliding on the surface of the inclined plane $d$, pushes back the spring of the pulley and releases the pressure and friction on pulley Y. Thus, if pulley Y has been carried any portion of a revolution by X, it will, immediately it is released, fly back to its normal position by means of the cord and spring $f$, which turns back the pulley until the stud $i$ is brought into contact with the stop $g$, Fig. 22. The pulley Z, which carries the finger, has a stud, $k$, Fig. 21, fixed in its side corresponding to the stud $i$ in pulley Y. The pulley Z is provided with a friction-brake, $m$, operated as hereinafter described; also with a cord and spring, $p$.

The motion of the pulleys will be, perhaps, more clearly shown by the diagrams, Figs. 5 to 9. In Fig. 5 the pulley Y is shown with the stud $i$ pressing against the stop $g$ attached to the framing, and the stud $k$ is shown pressing against $i$. When the pulley Y is advanced by the friction-pulley X it carries along with it the pulley Z by means of the stud, as shown in Fig. 6, where $k$ has been moved about one-fifth of a revolution. Fig. 7 shows the position of the parts when, the stop $i$ having reached the position shown in Fig. 6, the friction on the pulley Y has been released, and the pulley has gone back to its normal position, but has left the pulley Z with its stop in the position shown at $k$, where it has been, (during the return of Y,) and still is, retained by the brake $m$. If the brake $m$ were released, then the pulley Z would run back until its stud assumed the position shown at $k$ in Fig. 5; but assuming the pulley Z had not been released, its stud would been overtaken by the stud $k$ at $n$, and have been carried farther on, as shown at Fig. 8. By releasing the friction on the pulley Y it again returns to its normal position, and immediately the pressure is again applied it advances. Now, Fig. 9 shows the position of the parts when, the pulley Y having been moved a short distance only, and the brake $m$ having then been taken off the pulley Z, the stud $k$ of Z has returned to the stud $i$, and remains in the position at which it has so been arrested, for the brakes are put into action at the termination of each minute or other predetermined unit of time for which the apparatus is set or constructed, and what then takes place is as follows: First, the brake $m$ is raised and lowered; then the fork B presses back the pulley X. Thus the pulley Y runs back to its normal position at the termination of each minute or other unit of time, but leaves the pulley Z at the spot reached, and the pointer, being attached to the pulley Z, shows on the dial the position, and the number of the revolutions made.

In order that the friction-pulley arrangement may be thoroughly understood, I have illustrated the same detached in section in Fig. 10, and to a larger scale in Figs. 11 to 20, and in Figs. 21 and 22 I have shown back and front views, respectively, of the pulley Z and of the pulley Y, and some parts connected thereto.

In Fig. 10, 60 represents the shaft. The pulley Z is fitted loosely onto the shaft 60, so as to be capable of rotating thereon, but is, by the shoulder on the shaft and by the pin and washer 61, prevented from moving lengthwise of the shaft. 62 is the finger or pointer; 63, the friction-surface for the brake $m$; $k$, the stud. Between the pulleys Z and Y a collar, 70, is secured to the shaft, as shown. This collar receives the pressure of the pulley Y, so as not to throw any pressure upon the pulley Z. 71 is the groove for the cord in the pulley Z. 64 is the groove for the cord in the pulley Y. The stud of the pulley Y is shown at $i$, but the stop $g$, Fig. 4, is omitted. 65 is the groove of the pulley X, in which the fork B, Fig. 4, works, and 66 shows the slotted barrel, forming part of the pulley and the spring. 72 is a washer, which the spring presses against the pin 67. The pulley can be pushed back by the fork B against the pressure of the spring into the position indicated by the dotted lines 73, thereby relieving the surface of the pulley Y from the pressure of the pulley X.

The back view, Fig. 21, of the pulley Z, shows the position of the stud $k$, when the finger is in its normal or zero position, and the cord 68, which is attached to the spring shown at $p$, Fig. 2.

The front view, Fig. 22, of the pulley Y shows the position of the stud $i$ when the pulley is in the position corresponding to the normal position of the finger, (see also Fig. 5,) and pressing against the stop $g$. Shown in dotted lines.) The cord 69 is also shown, which is attached to a spring, as at $f$, Fig. 4.

The remainder of the mechanism of the machine is merely for the purpose of moving the pulley X, and for the throwing in and out of action of the brake and friction apparatus, and motion for these operations is, as already stated, derived from the lever A. To the lever A a catch-bar, L, is jointed at $h$, and at each depression of the shorter arm of the lever A the catch draws down one tooth of the ratchet-wheel R. This ratchet-wheel is fixed on the end of a spindle, upon which is fixed a pinion, $t$, geared into a wheel, $w$. The wheel $w$, therefore, being fixed upon the same shaft as the pulleys X Y Z, causes their motion, and in the apparatus shown in Figs. 1 to 22 of the drawings makes a complete revolution to every one hundred and forty draws of the catch-bar L. But as this machine is not arranged to indicate a speed greater than one hundred and thirty revolutions per minute, the pulleys Y and Z are thrown out of gear before that number is reached, and that is done in the following manner: The machine is divided into two sections, G and H, the latter being simply a train of clock-work with an ordinary escapement. In this instance it is a common house-clock lever escapement, terminating at one end with the minute-hand shaft Q. Upon the end of this shaft, Fig. 2, is fixed a cam or tappet, $q$, which, at the termination of each minute, presses and pushes forward the lever V. Now, this lever V throws into gear the mechanism which releases the brake $m$ and the friction-pulley $x$. There is an L-shaped slot at $s$ in the lever V, through which protrudes its fulcrum-pin, upon which pin the lever rests and slides. The lever V slides in the forked pieces $o$ $o$. Its right-hand end has attached to it a spring, $u$, and when the lever is pushed forward in the direction of the arrow, Fig. 2, by the cam Q, the spring suddenly pulls the lever upward and the pin $s$ enters the lower part of the slot, and also brings the pin $j$ into contact with the curved part $x$ of the catch-lever N. There is also on the bar N a stud, $r$, which, when the bar is depressed, carries with it the lever V to its normal position, after being raised by the spring $u$ and the slot $s$. By this motion the lever N is forced forward toward the right hand, and the hook 2 at its lower end is brought underneath the stud 3, fixed in the lever A. Thus when that arm of the lever A is depressed it draws down the catch-lever N, which, by means of the studs $u$ $u'$, carries with it the lever C, whose fulcrum is at 4, and this lever operates the brake and clutch apparatus as follows: The hook-bar 5, fixed on the pin 6, hooks at 5* upon a pin, 7, fixed in the brake-lever $m$. The brake-lever turns on the fulcrum-pin 8, and as the pin 7 and its end of the lever are drawnward, the hook and pin are thrown out of contact by the operation of the inclined upper end of the hook-bar upon the pin 9. Thus in the downward motion of the lever C and catch-bar 5, the brake $m$ is is released only momentarily, and recovers its position before the friction apparatus is operated upon.

The movement of the lever C having released the brake $m$ before the right-hand arm of the lever A has descended through about half the space it has to move, or from 10 to 11, Fig. 2, the lever A continues its motion to 12. In this last part of the motion the adjusting-screw $e$ of the lever C slides down the inclined plane $d$ of the fork B, which is consequently pressed backward, and with it the pulley X. Thus the pulley Y is released from the gripe, and, by the cord $f$ and spring, is returned to its normal position, leaving the pulley Z and finger retained by the brake $m$ in the position they had attained at the moment of the pulley Y commencing its return movement.

It will now be seen that the motions must be properly timed in order to assure the correct working of the finger.

I would here remark that the apparatus may be modified by dispensing with the pulley Z and fixing the finger on the pulley Y, but this plan would be imperfect, for the finger would travel back to zero at the conclusion of each minute or other predetermined unit of time, and at the termination of the minute or other unit of time only would the speed be ascertainable.

The clock-work, as before stated, is an ordinary train of wheels, as shown in Fig. 3, in which 13 is the escapement and 14 the minute arbor upon which the cam Q, Fig. 2, is fixed; but there is a self-acting winding-up apparatus, which, during the motion of the lever A, constantly keeps the clock going without any further attention. This is performed by means of the winding-lever D, Fig. 2, which carries upon it a small pawl, 15, taking into the ratchet-wheel 16. This ratchet-wheel is fixed on the end of the arbor 15, Fig. 3, in the present instance, but any other arbor of the train may be employed that may be suitable for the purpose. Now, the winding-lever D is provided with a strong spiral spring, 20, to draw it downward, and thus cause the pawl 15 to operate upon the train of wheels and keep the clock in motion. When the winding-lever D arrives at its lowest point its shoulder 19 rests upon the pin 18, (one of the pins 18 and 17 which constitute a slot-like guide,) and the result is that the catch 120 is carried forward and over the stud 21 of the lever A. On the ascent of that end of the lever A the winding-lever D is carried up, and consequently the clock is thereby wound up.

It will be observed that so long as the winding-lever D does not rest upon the shoulder 19 the force of the small spring 23 keeps the pawl 15 in gear with the ratchet-wheel. This is indicated by the respective positions of the parts shown at 22 and 24.

The catch-lever N is held in its normal position, Fig. 2, by the spring 25, and by means of the shoulder 26 the hook 2 is kept clear of the pin 3 until pushed into gear by the lever V, as before stated. In like manner each of the levers is held in its normal position by means of a spring, as the drawings show. Thus the lever C is held up by the spring 27, and the hook-bar 5 is held in position by the spring 28, and the lever A by the spring 29.

Figure 23:
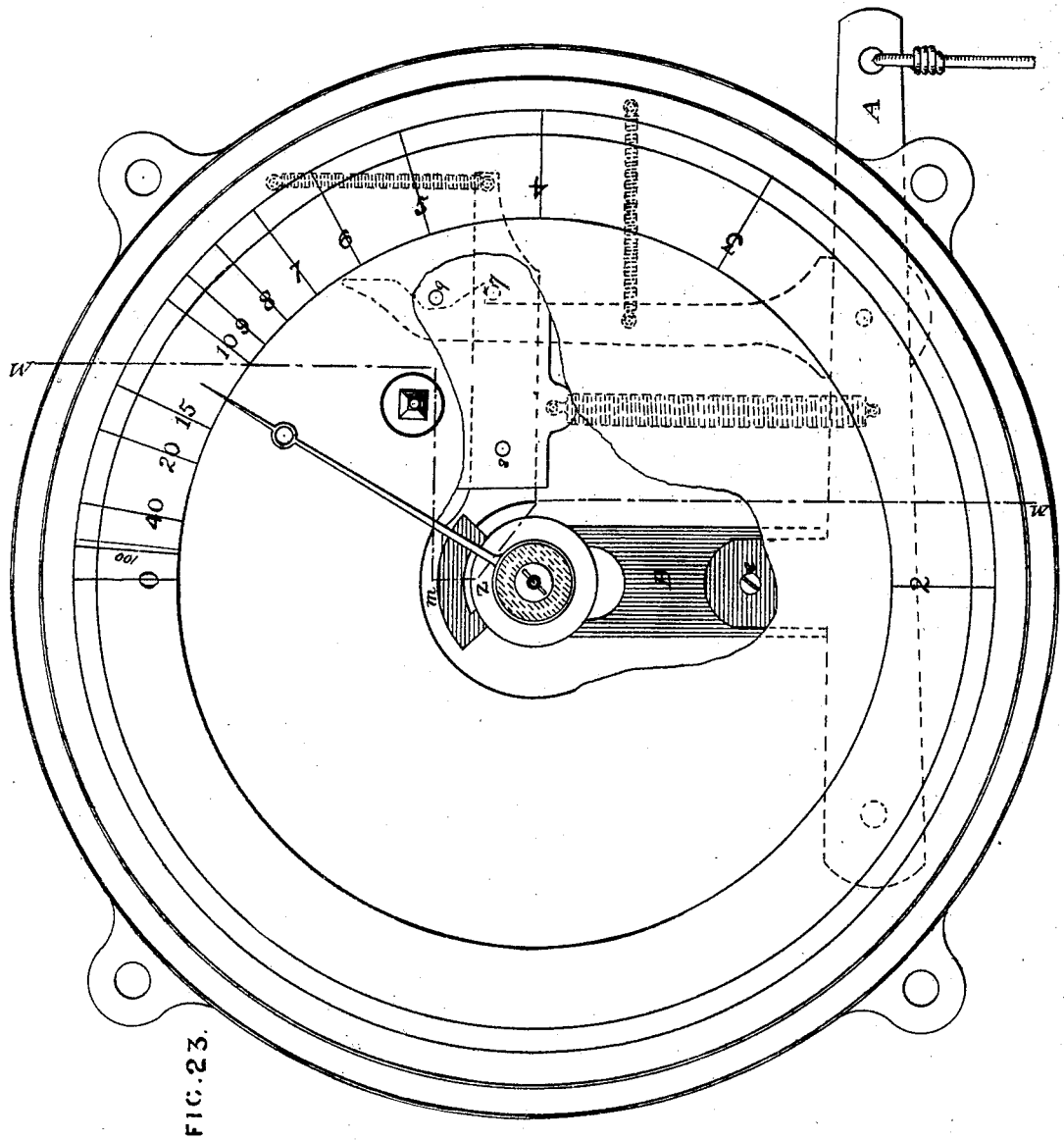

In the machine above described, the pulleys X Y Z receive motion through mechanism from the engine or shaft, to be indicated without the intervention of the clock, whose duty is confined to setting in motion the apparatus for operating the brake and friction apparatus on the termination of the unit of time for which the apparatus is arranged. But sometimes I modify the apparatus so that this order is reversed. Such a modification is shown in Figs. 23 and 24, representing an apparatus in which motion is given to the pulleys through the medium of clock-work, and the friction-brakes are released by the engine or shaft to be indicated, setting in motion the apparatus for operating the brake and friction apparatus on the termination of the unit of time for which the apparatus is arranged, without the intervention of clock-work for that purpose. This plan is more especially designed for indicating the time within which one, two, or more revolutions shall have been made—in other words, the finger, while being moved forward by the clock, indicates time and the commencement of its return to its normal or zero position, indicates the conclusion of the revolution or movement, or revolutions or movements, be the number one or five, or ten, or otherwise, which the apparatus is arranged to indicate. Hence the position whence the finger commences its return stroke will show within what time the shaft or body to be indicated has made the revolution or movement, or revolutions or movements, for which the apparatus is arranged. It will be evident that this arrangement, though well adapted for indicating slow revolutions or movements, is not suitable for indicating single revolutions or movements of great speed. But by arranging the apparatus so that the finger shall return to its normal position only at every tenth or twentieth or other suitable number of revolutions or movements, high speeds may be indicated.

It will be observed that the dial is divided differently to that of the apparatus already described. In this case, the pulleys X Y Z are placed upon the minute-arbor of the clock, and the finger would, consequently, make a whole revolution of the dial if it were not released by the operation of the friction apparatus. Now, supposing the finger to be carried over half of the circumference of the dial and then released, it would stop in that position until the next time the friction-pulleys X Y were drawn apart, as described with reference to the last machine. Thus, if the finger stopped at half a revolution, it would stop opposite the figure 2, showing that the speed has been for that revolution at the rate of two per minute. Again, if it stopped at a fourth part of the circumference, it would point to the figure 4, which would be the rate per minute that the revolution was made in. For slow-working shafts, each revolution may, by this means, be shown; but by making the minute-hand revolve, say, ten times per minute, then the figures on the dial would be increased and become tens instead of units. Thus 2 would be 20 and 4 become 40.

If very fast speeds are to be recorded, a ratchet-wheel, with a stud, may be used, so that at every five, ten, or twenty revolutions the speed may be indicated. It will thus be evident that many modifications may be made without in the least affecting the principle of the action.

In the sectional view, Fig. 24, the clock-work may be driven by winding up the lever marked A through a lever like that at D, Fig. 2, or it may be done as in ordinary clocks, and in this case, as in the previously described machine, the self-winding arrangement may be dispensed with.

The brake and friction apparatus resemble those before described, and the same numbers and letters refer to the same parts.

The frame-work of the above machines may be made as shown in Fig. 4, where 30 and 31 are two circular plates inclosed in a drum, 34. The front plate 32 may be cut away as required, as shown in Figs. 2 and 4. The dial 33 may be in any form desired.

Several portions of the working parts have been omitted to avoid complication, such as the train of clock-work in Fig. 24, &c.

It will be obvious that the connection between the lever A of the machine and the shaft or body to be indicated, may be made in various ways, as pneumatic, magnetic, or mechanical means.

It will also be evident that a recording-register may be connected with the machine.

The dial may be arranged to represent miles or other measurements, as desired, for locomotives, ships, logs, and other bodies and measuring machines.

In cases of very slow speeds, or when desired, the machine may be arranged to indicate not only each revolution, but portions of revolutions, by adapting the attachment for that purpose.

I claim—

1. The combination, with a pulley or boss, Z, finger 62, dial 33, brake $m$, spring and cord P, or their equivalents, of a pulley, Y, provided with a stud, $i$, arranged to operate in conjunction with a stud, $k$, on the pulley or boss Z, and a driving-pulley, X, provided with a spring, 66, for pressing it against the pulley Y, and with disengaging apparatus for moving it out of contact or gear with said pulley at the proper times, as herein set forth and described, for the purpose specified.

2. The combination, with the grooved pulley X and its spring 66 on the shaft 60, of the fork B, with its incline $d$ and the adjusting-screw $e$ or its equivalent, operated as described, for moving the pulley X out of contact or gear with the pulley next to it, as herein set forth.

3. The combination of the lever A, lever C, hook-bar 5, brake-lever $m$, catch-lever N, and slotted lever V, operated by clock mechanism, the whole so constructed and arranged, as by the action of the clock mechanism to release the pulley or needle boss Z from the pressure of the brake $m$, and, after the return of said brake, to move the pulley X out of contact or gear with the pulley next to it, substantially as herein set forth, for the purpose specified.

4. The combination, with the lever A, shaft 60, pulley Z, needle and dial, of the catch-bar L jointed to the lever A, and the ratchet-wheel R geared to the shaft 60, substantially as described, for the purpose specified.

5. The combination, with the pulleys X Y Z and fork B, of the shaft or axis 60, driven by clock mechanism, and having the said pulleys so arranged upon it as that the pulley X may be shifted by the fork B, but that when said pulley is in its normal position the clock mechanism will drive the pulleys Y and Z, and so move the finger forward over the dial 33, by means of the shaft 60 and pulley X, all substantially as herein set forth, for the purpose specified.

ALFRED BARLOW.

Witnesses:
W. G. BAGNALL,
 *Chandor Chambers, Adelphi.*
F. J. BROUGHAM,
 *Clerk to Mr. W. Lloyd Wise,*
  *Patent Agent, London.*